United States Patent

Schenk

[11] Patent Number: 5,816,585
[45] Date of Patent: Oct. 6, 1998

[54] CHUCK ELEMENT FOR MACHINE TOOLS WITH ROTATING JAW CHUCK

[75] Inventor: Rainer Wilhelm Heinrich Schenk, Klausdorf, Germany

[73] Assignee: Linotype-Hell AG, Kiel, Germany

[21] Appl. No.: 750,898

[22] PCT Filed: Apr. 24, 1996

[86] PCT No.: PCT/DE96/00709

§ 371 Date: Dec. 19, 1996

§ 102(e) Date: Dec. 19, 1996

[87] PCT Pub. No.: WO96/33834

PCT Pub. Date: Oct. 31, 1996

[30] Foreign Application Priority Data

Apr. 28, 1995 [DE] Germany .................... 195 15 644.7

[51] Int. Cl.[6] .................................................. B23B 25/04
[52] U.S. Cl. ............... 279/125; 192/129 A; 192/135; 200/61.58 R; 279/148; 279/157; 408/4; 408/710
[58] Field of Search ........................... 279/110, 125, 279/148, 157; 200/61.58 R; 192/129 R, 129 A, 133, 135; 408/4, 710, 241 G

[56] References Cited

U.S. PATENT DOCUMENTS

| | | | |
|---|---|---|---|
| 1,454,898 | 5/1923 | Lee | 192/133 |
| 2,578,317 | 12/1951 | Pealer | 279/125 |
| 2,706,544 | 4/1955 | Schuman | 192/129 A |
| 3,761,654 | 9/1973 | Davis | 279/148 |
| 3,814,876 | 6/1974 | Biafore | 200/61.58 R |
| 4,290,717 | 9/1981 | Aslen | 408/241 G |
| 4,563,013 | 1/1986 | Hunger et al. | 279/64 |
| 4,655,464 | 4/1987 | Manschitz et al. | 279/64 |

FOREIGN PATENT DOCUMENTS

| | | | |
|---|---|---|---|
| 916814 | 12/1946 | France | 408/241 G |
| 2 436 651 | 9/1978 | France . | |
| 2 244 439 | 5/1991 | United Kingdom . | |

OTHER PUBLICATIONS

The Principles and Techniques of Mechanical Guarding, Bulletin No. 197. U.S. Department of Labor, p. 39., Jul. 1959.

*Primary Examiner*—Steven C. Bishop
*Attorney, Agent, or Firm*—Hill & Simpson

[57] ABSTRACT

A chuck system for machine tools with a rotating jaw chuck has clamping jaws of the jaw chuck which can be radially adjusted relative to an axis of rotation. The clamping jaws are displaceably mounted in a bearer connected with a drive shaft, and in which engagement openings for the introduction of an adjustment tool for the positioning of the clamping jaws are arranged in the region of the bearer. The bearer is surrounded by a protective sheath that is guided so as to be displaceable in the direction of the axis of rotation. The protective sheath comprises through openings, which are arranged so as to be congruent to the engagement openings in a handling position of the protective sheath, and are arranged so as to be offset to the engagement openings in an operating position of the protective sheath. In the operating position, the clamping jaws are radially surrounded, at least in regions, by the protective sheath. In the handling position, the protective sheath brings an operating switch into a switched-off position.

10 Claims, 3 Drawing Sheets

CHUCK ELEMENT FOR MACHINE TOOLS WITH ROTATING JAW CHUCK

BACKGROUND OF THE INVENTION

The invention concerns a chuck element for machine tools with a rotating jaw chuck, in which clamping jaws of the jaw chuck are radially adjustable relative to an axis of rotation, and in which the clamping jaws are mounted displaceably in a bearer connected with a drive shaft, and in which engagement openings are arranged in the region of the bearer for the introduction of an adjusting element for the positioning of the clamping jaws.

Machine tools of this sort are used in a plurality of embodiments. For example, different embodiments are lathes or milling machines. Another embodiment is that of an engraving machine for printing cylinders for rotogravure. Before the beginning of the engraving, the print cylinder is clamped into the engraving machine. The clamping in of the print cylinder occurs in such a way that axis pieces of the print cylinder are held in adjustable jaw chucks. Normally, three clamping jaws are thereby used. This clamping ensures a secure seating of the print cylinder during engraving. Chuck devices of this sort are also used for fastening scanning cylinders.

However, the known machine tools comprise certain operating characteristics that do not guarantee all requirements for an optimal working safety. For the adjustment of the clamping jaws, it is necessary to introduce a suitable tool into the rotatably mounted part of the machine tool. If the machine tool is unintentionally switched on during the introduction of the tool or of the print cylinder, operator injury can result. Another problem is that with clamping jaws that protrude externally, sharp edges are exposed, which can cause injury if immediate contact with the hand of an operator takes place. This is likewise critical above all for rotating machine parts.

SUMMARY OF THE INVENTION

It is an object of the present invention to construct a machine tool of the type named above in such a way that operating safety is increased.

According to the invention, a chuck system is provided for machine tools. The chuck system has a rotating jaw chuck and clamping jaws of the jaw chuck which are radially adjustable relative to an axis of rotation. The clamping jaws are displaceably mounted in a bearer that is connected with a drive shaft. Engagement openings are arranged in a region of the bearer for introduction of an adjustment tool for positioning of the clamping jaws. The bearer is surrounded by a protective sheath that is displaceably guided in a direction of rotation. The protective sheath has two openings which in a handling position of the protective sheath are arranged congruent to the engagement openings and in an operating position of the protective sheath are arranged so as to be offset to the engagement openings. The protective sheath at least partially radially surrounds the clamping jaws The invention is explained in more detail on the basis of FIGS. 1 to 4.

DESCRIPTION OF THE PREFERRED EMBODIMENTS

Figure 1:
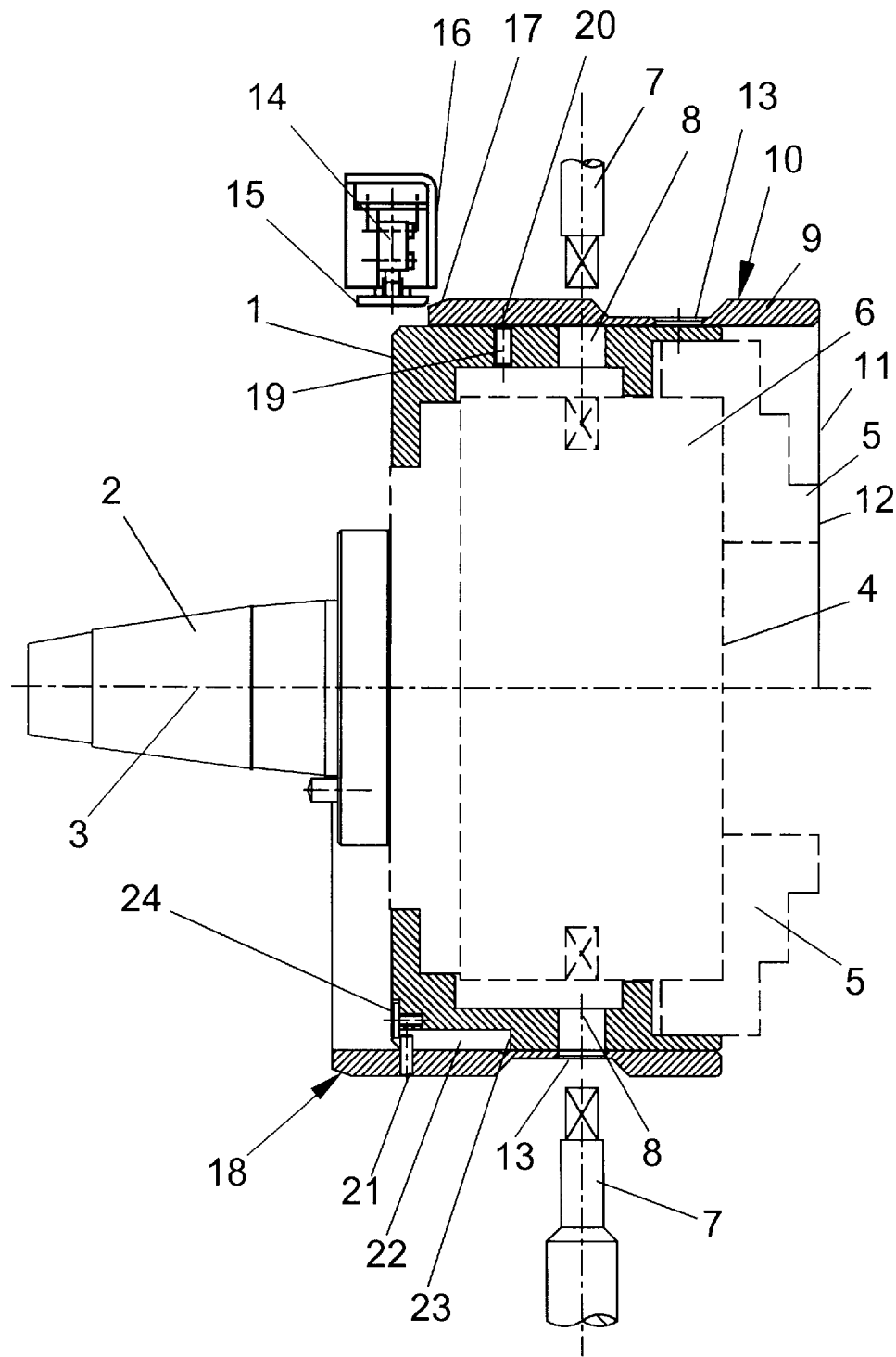
FIG. 1 is a cross-section through a bearer provided with a jaw chuck, the bearer being surrounded by a protective sheath.

FIG. 1 shows a cross-section through a bearer 1 that can be coupled with a drive shaft (not shown) of a drive motor via a connecting element 2. The bearer 1 thereby extends along an axis of rotation 3. In general, the drive shaft of the drive motor is oriented in the direction of the axis of rotation. However, it is also possible in principle to implement a different arrangement of the drive motor via a corresponding deflection gearing.

The bearer 1 comprises a jaw chuck 4 on its side facing away from the connecting element 2, which jaw chuck is formed of clamping jaws 5 arranged displaceably along jaw guides 6. A displacement of the clamping jaws 5 can occur only by means of an adjustment tool 7, which can be introduced into engagement openings 8 of the bearer 1. A positioning of the clamping jaws 5 relative to the bearer 1 can occur via a suitable coupling, e.g. via interlocked elements or spindle-shaped elements with riders. Upon removal of the adjustment tool 7, an unintentional adjustment of the clamping jaws 5 is avoided by means of suitable catches.

The bearer 1 is surrounded by a protective sheath 9 that can be displaced relative to the bearer 1 in the direction of the axis of rotation 3. In an operating position 10 of the protective sheath 9 shown in the upper part of FIG. 1, a front edge 11 of the protective sheath 9 is arranged so that an upper edge 12 of the clamping jaws 5 is somewhat covered. This ensures that in the operating position 10 the clamping jaws 5 do not protrude from the protective sheath 9 in a direction facing away from the connecting element 2, or at least do so only insignificantly. The protective sheath 9 likewise covers the jaw chuck 4 transverse to the axis of rotation 3.

In the operating position 10 region of the protective sheath 9 are arranged so as to be offset relative to the entry openings 8 of the bearer 1. In this way, it is not possible to introduce the adjustment tool 7 into the engagement openings.

An operating switch 14 assumes its switched-on setting in the operating position 10 of the protective sheath 9. The switched-on setting is preferably constructively designed in such a way that an actuating element 15 of the operating switch 14 protrudes from a base member 16 of the operating switch 14. This prevents malfunctioning of the operating switch 14, for example given a wedging of the actuating element 15. A wedging is possible with the selected design construction only in the switched-off setting of the operating switch 14; in this way, risks to the operating personnel are avoided.

For the positioning of the actuating element 15, the protective sheath 9 comprises a leading edge 17 arranged along its circumference. The leading edge 17 is formed as a beveling which presses in when the protective sheath 9 is retracted from the operating position 10 into a handling position 18 shown in the lower half of FIG. 1, and thus guides the operating switch 14 over into its switched-off setting.

In the handling position 18 of the protective sheath 9, the engagement opening 8 and the through opening 13 are arranged congruently with one another, so that the adjustment tool 7 can be introduced into the engagement opening 8, by which means the clamping jaws 5 are positioned. It is for example possible, using the clamping jaws 5, to brace a workpiece to be processed with the bearer 1.

To avoid unintentional displacements of the protective sheath 9 relative to the bearer 1, a stop element 19 is arranged in the region of the boundaries of the bearer 1 facing one another and the protective sheath 9. The stop element 19 can be designed as a threaded bolt that engages in a corresponding recess 20. For example, according to FIG. 1 the stop element 19 can be arranged in the region of the bearer 1 and the recess 20 can be provided in the region of the protective sheath 9. However, it is likewise possible to select a complementary embodiment. In a displacement of the protective sheath 9, a force must first be overcome that retracts the stop element. A displacement of the protective sheath 9 is possible only after overcoming this force.

It is likewise useful to provide a limiting of the positioning path of the protective sheath 9 relative to the bearer 1. A possible realization of such a limiting of the positioning path is shown in FIG. 1. Here a pin 21 is set in a boring of the protective sheath 9, which pin protrudes inwardly from the protective sheath 9 in the direction towards the axis of rotation 3. The pin 21 thereby engages in a longitudinal groove 22 of the bearer 1 that extends essentially parallel to the axis of rotation 3. The longitudinal groove 22 direction towards the engagement opening 8 by a shoulder 23. When the pin 21 comes into contact with the shoulder 23, the protective sheath 9 is located in the operating position 10. A limiting element 24 is provided for the determination of the handling position 18. The limiting element 24 can be arranged on the bearer 1 and can extend, in regions, into the longitudinal groove 22. When the limiting element 24 contacts the pin 21, the protective sheath 9 assumes the handling position 18. In the embodiment shown in FIG. 1, the limiting element 24 is designed as a screw that is screwed into a boring of the bearer 1 and protrudes into the longitudinal groove 22 with a screw head.

The use of the protective sheath of the invention in connection with the operating switch comprises the following advantages. By means of the arrangement of the protective sheath in the region of the bearer, it is ensured that in the operating position the clamping jaws are laterally covered, and thus a risk of injury is avoided. In addition, in the operating position of the protective sheath it is not possible to introduce a tool for adjusting the jaw chuck into the bearer. Due to the arrangement of the through openings and of the engagement openings, an introduction of the tool is possible only given a retracted positioning of the protective sheath. However, in this retracted positioning the operating switch is switched off, so that an unintentional switching on of the machine tool is prevented. It is thus securely excluded that the machine tool can switch on when a tool is in use, and that the unprotected ends of the clamping jaws can rotate.

Figure 2:
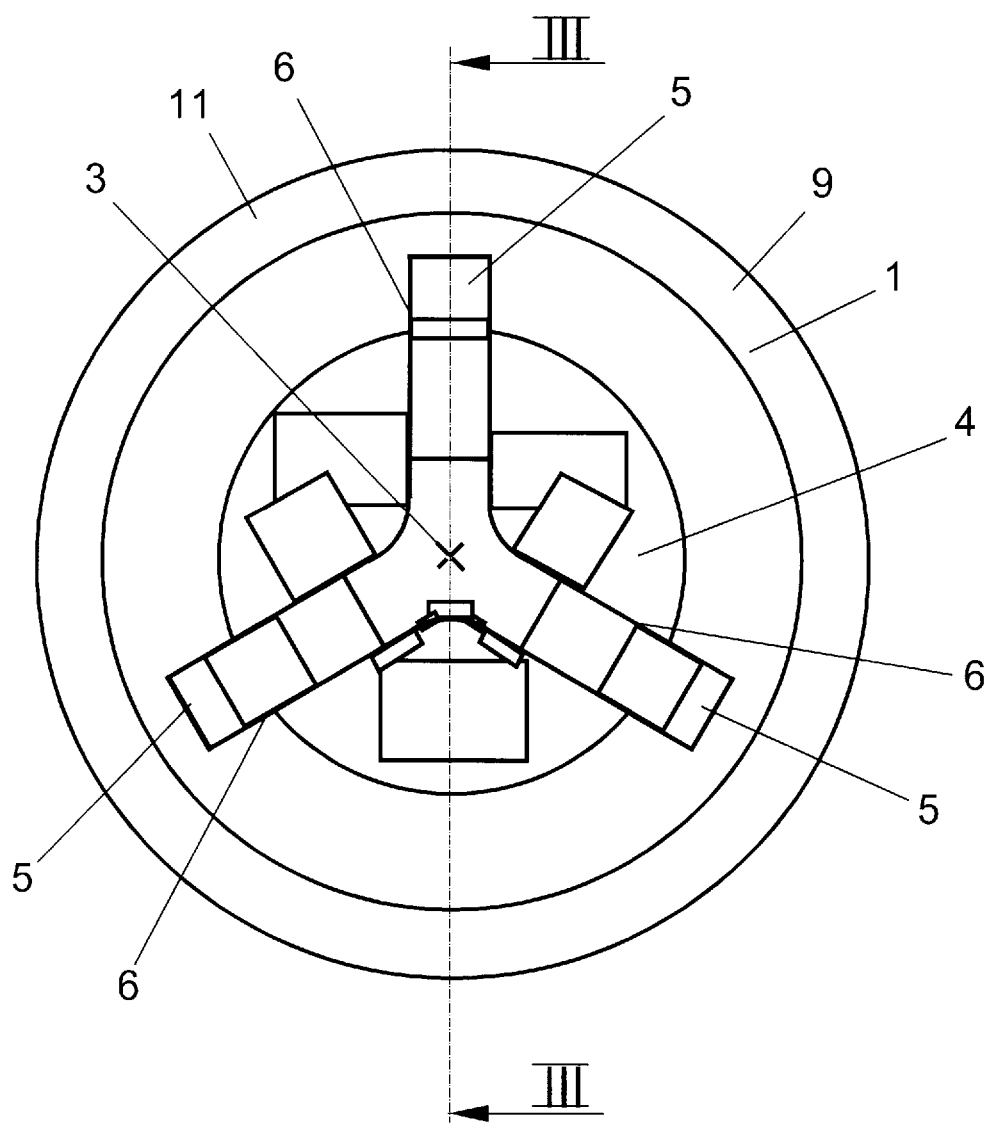
FIG. 2 is a highly schematized top view of a bearer with jaw chuck, with a positioning of the clamping jaws that is altered in relation to FIG. 1.

FIG. 2 schematically illustrates that the clamping jaws 5 can be positioned inside the jaw guides 6, and that their ends protrude from the bearer 1 in the radial direction. The protective sheath 9 surrounds the jaw chuck 4 in the radial direction, and thus avoids contact of operating personnel with the clamping jaws 5 in the operating position 10 of the protective sheath 9.

Figure 3:
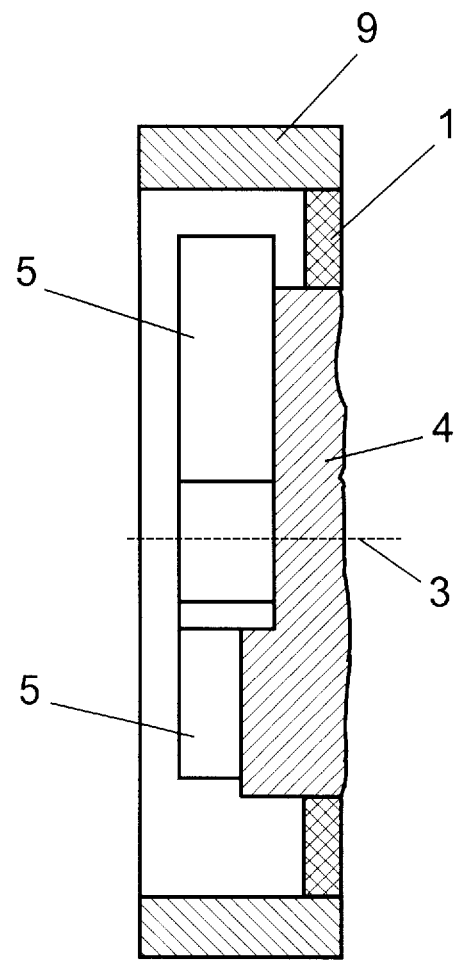
FIG. 3 shows a cross-section according to the sectional line III—III in FIG. 2.

FIG. 3 again illustrates schematically that an external contact with the clamping jaws 5 is not possible transversely to the axis of rotation 3.

Figure 4:
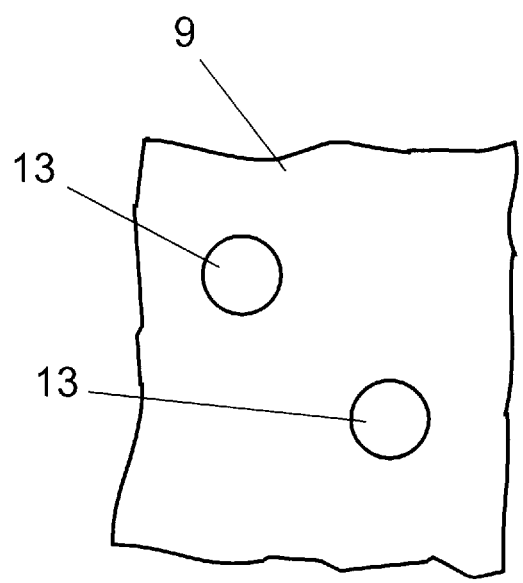
FIG. 4 is a partial representation of a region of the circumference of the protective sheath.

FIG. 4 shows that, for a circumferential region of the protective sheath 9, through openings 13 can be respectively arranged pair by pair in the region of the protective sheath 9. This corresponds with a corresponding pair-by-pair arrangement of engagement openings 8. One of the engagement openings 8 is provided for the positioning of the clamping jaws 5 and the other engagement opening 8 is provided for the radial displacement of the entire jaw chuck 4, in order to implement a rotationally symmetrical arrangement in relation to the axis of rotation 3. In order to support a simple handling, three pairs of through openings 13 are respectively arranged along the circumference of the protective sheath 9, offset by 120° to one another. In the region of the bearer 1, three pairs of entry openings 8 are correspondingly provided.

By means of the radial surrounding of the clamping jaws 5 by the protective sheath 9 in the operating position 10, it is also ensured that an impermissibly wide arrangement of the clamping jaws 5 cannot be implemented. It is compulsory that the clamping jaws 5 here always be arranged so far inside the jaw guides 6 that a sufficient fastening of the clamping jaws 5, and thereby a safe operation, is ensured.

It is thus not possible to exceed a maximal chuck region, which is to be maintained in a manner conditioned by the construction.

A standard chuck key can be used as an adjustment tool 7 for the positioning of the clamping jaws 5 relative to the jaw guide 6. To ensure the true running of the jaw chuck 4, wedge rod adjustments can be used.

Although various minor changes and modifications might be proposed by those skilled in the art, it will be understood that my wish is to include within the claims of the patent warranted hereon all such changes and modifications as reasonably come within my contribution to the art.

We claim as our invention:

1. A chuck system for an engraving cylinder in an electronic engraver, comprising:

a rotating jaw chuck for engagement with an electronic engraver engraving cylinder, clamping jaws of the jaw chuck being radially adjustable relative to an axis of rotation;

the clamping jaws being displaceably mounted in a bearer that is connected with an engraving cylinder drive shaft;

engagement openings arranged in a region of the bearer for introduction of an adjustment tool for positioning of the clamping jaws;

the bearer being surrounded by a protective sheath that is displaceably guided in a direction of the axis of rotation;

the protective sheath comprising through openings which in a handling position of the protective sheath are arranged congruent to the engagement openings and in an operating position of the protective sheath are arranged so as to be offset to the engagement openings;

the protective sheath at least partially radially surrounding a leading end of the clamping jaws when the sheath is in the operating position and being withdrawn from the leading end of the clamping jaws in the handling position; and in said handling position, the protective sheath actuating an operating switch into a switched-off position.

2. A chuck system according to claim 1 wherein the operating switch comprises an actuating element that is pressed into a base member of the operating switch in the switched-off position of the operating switch.

3. A chuck system according to claim 1 wherein three engagement openings are arranged along a circumference of the protective sheath and which are offset by 120° to one another.

4. A chuck system according to claim 1 wherein the operating switch is actuated by a rearward edge of the protective sheath.

5. A chuck system according to claim 1 wherein for determination of the operating position of the protective sheath, a stop that limits mobility of the protective sheath relative to the bearer is provided.

6. A chuck system according to claim 1 wherein for determination of the handling position of the protective sheath, a stop that limits mobility of the protective sheath relative to the bearer is provided.

7. A chuck system according to claim 1 wherein a stop element for predetermination of a least adjustment force of the sheath is arranged in a region of contact of the bearer and the protective sheath.

8. A chuck system according to claim 1 wherein a guide element for prevention of rotational movements of the protective sheath relative to the bearer is arranged in a region of boundary surfaces facing one another of the bearer and the protective sheath.

9. A chuck system for machine tools, comprising:

a rotating jaw chuck, clamping jaws of the jaw chuck being radially adjustable relative to an axis of rotation;

the clamping jaws being displaceably mounted in a bearer that is connected with a drive shaft;

engagement openings arranged in a region of the bearer for introduction of an adjustment tool for positioning of the clamping jaws;

the bearer being surrounded by a protective sheath that is displaceably guided in a direction of the axis of rotation;

the protective sheath comprising through openings which in a handling position of the protective sheath are arranged congruent to the engagement openings and in an operating position of the protective sheath are arranged so as to be offset to the engagement opening;

the protective sheath at least partially radially surrounding the clamping jaws;

two pairs of through openings are respectively arranged along a circumference of the protective sheath so as to be offset by 120°; and in each pair of through openings, one of the through openings corresponds respectively with an engagement opening for radial positioning of the clamping jaws, and an additional through opening corresponds with an engagement opening for rotationally symmetrical arrangement of the jaw chuck relative to the axis of rotation.

10. A chuck system for an engraving cylinder in an electronic engraver, comprising:

an electronic engraver having an engraving cylinder;

a rotating jaw chuck for engagement with said engraving cylinder, clamping jaws of the jaw chuck being radially adjustable relative to an axis of rotation;

the clamping jaws being displaceably mounted in a bearer;

at least one engagement opening arranged in a region of the bearer for introduction of an adjustment tool for positioning of the clamping jaws;

the bearer being surrounded by a protective sheath that is displaceably guided in a direction of the axis of rotation;

the protective sheath comprising at least one through opening which in a handling position of the protective sheath is arranged congruent to the engagement opening with the sheath withdrawn from a region of a leading end of the clamping jaws, and in an operating position of the protective sheath is arranged so as to be offset to the engagement opening with the sheath radially surrounding a region of a leading end of the clamping jaws; and the protective sheath activating a cut-off switch in said handling position which prevents operating rotation of the jaw chuck.

* * * * *